Jan. 19, 1926. 1,570,421
A. ABRAHAM
WATER POWER ENGINE FOR UTILIZING LOW GRADE WATER POWERS
Filed August 29, 1921

Inventor:
Adolf Abraham
by: Herbert G. Ry
Attorney.

Patented Jan. 19, 1926.

1,570,421

UNITED STATES PATENT OFFICE.

ADOLF ABRAHAM, OF CHARLOTTENBURG, GERMANY.

WATER-POWER ENGINE FOR UTILIZING LOW-GRADE WATER POWERS.

Application filed August 29, 1921. Serial No. 496,551.

*To all whom it may concern:*

Be it known that I, ADOLF ABRAHAM, a citizen of the German Republic, and resident of Charlottenburg, Germany, have invented a new and useful Improved Water-Power Engine for Utilizing Low-Grade Water Powers, of which the following is a specification.

This invention relates to a power motor of the kind comprising an open float arranged in a well which separates two different water heads, automatically operated valves being provided which cause the float to rise and sink by the alternate filling and emptying of the same.

The invention consists in the provision of valve-controlled, closed conduits whereby the float is alternately set in communication with the two water-heads so as to effect a corresponding change of head in the float, the arrangement being such that a change of head in the float alters the buoyancy of the latter and causes it in one instance to rise and empty itself gradually of its water contents, and in the other instance to sink and admit a fresh change of water. This arrangement has the advantage that the working stroke of the float is rendered independent of the difference between the two water-heads. Thus, very small water-heads and water supplies can be readily utilized for the driving of machinery or lifting loads or bulks of water.

Figure 1:
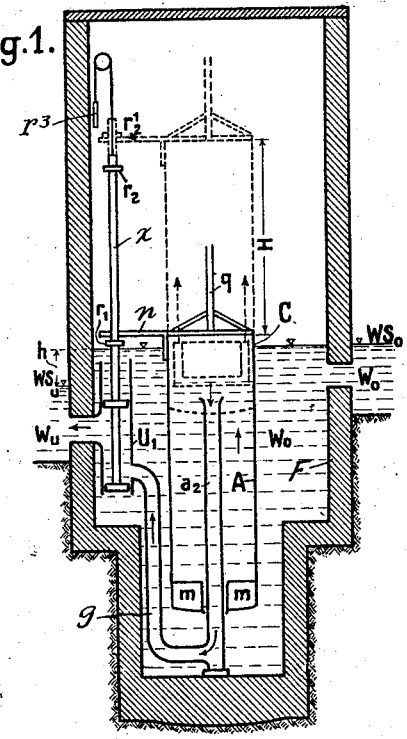
Figure 2:
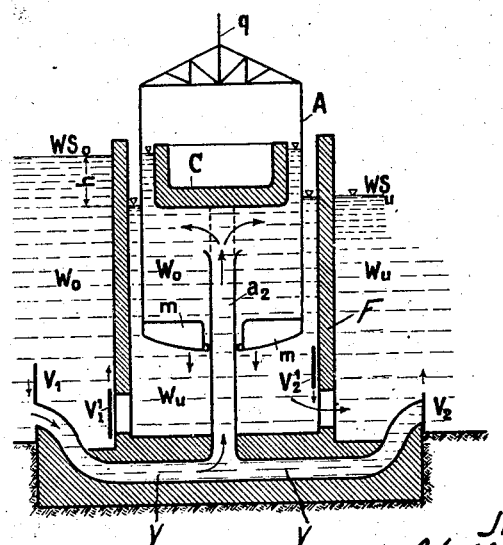

My invention is illustrated by way of example in the accompanying drawing, in which Figure 1 is a diagrammatic vertical section of a water-motor constructed and operating according to the invention, and Figure 2 is a similar illustration showing a modification.

The apparatus, to which I prefer to give the name "Aquapulsor", is composed of a water well F which is arranged so as to separate two waters $Wo$ and $Wu$, the surfaces $WSo$ and $WSu$ of which are on different levels. Within the well F, a hollow float A is arranged which, according to Fig. 1, is guided on an upright pipe $a^2$ whereby the float can be put into communication with either water head. For this purpose a vertically movable piston valve $u^1$ is provided which is operated by the float A at the ends of its travel, the operating rod $x$ being furnished with abutments $r^1$ and $r^2$ which are engaged by an arm $n$ connected to the float. The valve may be counter-balanced by a weight $r^3$. A pipe $q$ is connected to the pipe $a^2$ and also to the valve casing and puts the interior of the float into communication, through the casing, either with the water $Wu$ or the well, according to the position of the valve, the well being in constant communication with the water $Wo$.

The weight of the float is balanced by air-chambers $m$, for instance in such a degree that the float is but a little heavier than the water displaced by its wall. When its interior communicates with the head water $Wo$ the float sinks without doing work.

Fig. 1 shows the float by full lines in its lowest position and just after the valve has been reversed for setting the pipe $a^2$ into communication with the water $Wu$. The water within the float stands as high as the exterior water or level $WSu$. The float now rises, as the water within the float has fallen the distance $h$, leaving a space filled with air, in consequence of which an amount of water corresponding to this space is displaced. The force causing the rising of the float remains uniform during the entire stroke, as the water within the float remains constantly on the level $WSu$. The power causing the float to ascend (the float being only a little heavier than the water it displaces, as already mentioned) can drive also any desired device or apparatus or machine apt to be connected with the float, as for instance the piston rod of a pump, or a platform carrying a load or a vessel containing a liquid, or the like.

When the arm $n$ affixed to, and projecting laterally forth from, the float A contacts with the collar $r^2$ of the valve-rod $x$ which is vertically movable together with the valve-disks secured thereto, these disks are raised so much that the interior of the float is set in communication with the head-water $Wo$ through the pipe $q$, the lower valve disk being then situated above the orifice of this pipe. The level of the water within the float rises, thus, to the level $WSo$, and the float sinks to its lowest position (Fig. 1). The stroke H of the float may be varied at liberty and is independent of the difference $h$ between the two exterior levels.

In order to save water, and to shorten the time in which the water rises, or sinks, from one level to the other, that part in which the change of water-head takes place, is partly occupied by a stationary vessel C, so that only a small quantity of water is required for effecting the change.

While the construction of Fig. 1 is more suitable when work is to be performed only during one stroke of the float, that of Fig. 2 is more suitable when both strokes are to be effective. In this construction the pipe $a^2$ communicates by means of conduits V with the two waters, and the conduits are fitted with slide valves $V^1$ and $V^2$. The well F also communicates by means of ports with both sides, the ports being fitted with valves $V^1$ and $V^2$. The float A is here shown by full lines in its highest position and in communication with the water $Wo$, the well being in communication with the water $Wu$. The float has thus a tendency to sink in the well and will continue to do so until the valves are changed over, which is effected automatically by any suitable mechanical or electrical means. When the valves $V^2$ and $V^1$ are closed, and the valves $V^1$ and $V^2$ are opened, the water-heads of the well and of the float will be reversed, and the float will acquire a rising tendency.

I claim:

1. A water power engine, comprising, in combination, two basins containing water, the levels of these two bodies of water being different; a water-shaft communicating with said basin; a hollow float open at its top and arranged in said hollow shaft; control members so arranged as to permit the outer upper water to enter into the float and to rise to the level thereof, whereby the said float is caused to sink; said control members being also adapted to cause the upper water to flow continually into the float while this latter is sinking, and to permit the water present in the float to flow out until its level has reached that of the outer lower water whereby the float is caused to rise, the said control members permitting also the water present in the float to flow out continuously into the lower water while the float is rising, substantially as described.

2. In a water-motor, the combination, with two water-filled spaces having different levels, of a water well communicating with said spaces, a hollow float arranged in said well, a stationary vertical tube forming both a guide for the float and a communication between the interior thereof and said exterior water-spaces, and controlling means by which the exterior high-level water is permitted to enter the float and to rise to the level of said water, whereby the float is caused to sink, and the float water is permitted to leave the float until having fallen to the exterior low level whereby the float is caused to rise, as set forth.

3. In a water-motor, the combination, with two water-filled spaces having different levels, of a water well communicating with said spaces, a hollow float arranged in said well, a stationary water-displacing body arranged within the float and filling up the difference in height between the two exterior water-levels, and controlling means by which the exterior high-level water is permitted to enter the float and to rise therein to the level of said water whereby the float is caused to sink, and the float water is permitted to leave the float until having fallen to the exterior low level whereby the float is caused to rise, as set forth.

4. In a water-motor, the combination, with two water-filled spaces having different levels, of a water well communicating with said spaces, a hollow float arranged in said well, a stationary vertical tube forming both a guide for the float and a communication between the interior thereof and said exterior water-spaces, a stationary water-displacing body arranged within the float above said tube and filling up the difference in height between the two exterior water-levels, and controlling means by which the exterior high-level water is permitted to enter the float and to rise therein to the level of said water whereby the float is caused to sink, and the float water is permitted to leave the float until having fallen to the exterior low level whereby the float is caused to rise, as set forth.

5. In a water motor, the combination, with a float of valve-controlled closed conduits whereby said float is alternately set in communication with two water-heads so as to effect a corresponding change of head in the float, this change altering the buoyancy of the float and causing it in one instance to rise and empty itself gradually of its water contents, and in the other instance to sink and admit a fresh charge of water.

6. In a water motor, the combination, with a float of valve-controlled closed conduits whereby said float is alternately set in communication with two water-heads so as to effect a corresponding change of head in the float, this change altering the buoyancy of the float and causing it in one instance to rise and empty itself gradually of its water contents, and in the other instance to sink and admit a fresh charge of water, and a stationary vessel adapted to fill up partly the space of the float within which the change of water-head takes place.

7. In a water motor, the combination, with a float of valve-controlled closed conduits whereby said float is alternately set in communication with two water-heads so as to effect a corresponding change of head in the float, this change altering the buoyancy of the float and causing it in one instance to rise and empty itself gradually of its water contents, and in the other instance to sink and admit a fresh charge of water, and an upright pipe through which communication is established between it and the different water-heads, said pipe being so arranged as to guide the said float.

8. In a water motor, the combination, with a float of valve-controlled closed conduits whereby said float is alternately set in communication with two water-heads so as to effect a corresponding change of head in the float, this change altering the buoyancy of the float and causing it in one instance to rise and empty itself gradually of its water contents, and in the other instance to sink and admit a fresh charge of water; a stationary vessel adapted to fill up partly the space of the float within which the change of water-head takes place; and an upright pipe through which communication is established between it and the different water-heads, said pipe being so arranged as to guide the said float.

In testimony whereof I affix my signature.

ADOLF ABRAHAM.